Figure 1:
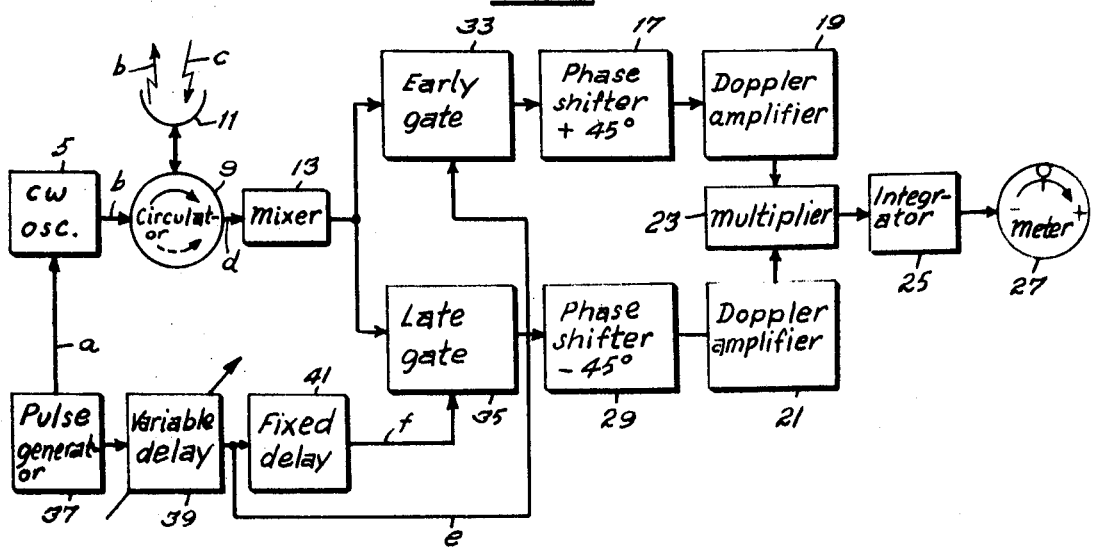

United States Patent

[11] 3,611,377

| [72] | Inventor | Otto E. Rittenbach |
| | | Neptune, N.J. |
| [21] | Appl. No. | 4,665 |
| [22] | Filed | Jan. 21, 1970 |
| [45] | Patented | Oct. 5, 1971 |
| [73] | Assignee | The United States of America as represented by the Secretary of the Army |

[54] DOPPLER RADAR WITH TARGET VELOCITY DIRECTION AND RANGE INDICATOR UTILIZING VARIABLE DELAY LINE
2 Claims, 2 Drawing Figs.

| [52] | U.S. Cl. | 343/12 R, 343/9, 343/17.2 R |
| [51] | Int. Cl. | G01s 9/04 |
| [50] | Field of Search | 343/9, 12 R, 17.2 R |

[56] References Cited
UNITED STATES PATENTS
3,422,430 1/1969 Rittenbach .................. 343/9

*Primary Examiner*—T. H. Tubbesing
*Attorneys*—Harry M. Saragovitz, Edward J. Kelly, Herbert Berl and Gordon W. Kerr ABSTRACT: The CW transmitter oscillator for this radar is periodically phase modulated by means of a pulse generator. The echo signals are combined with a sample of the transmitted signals and applied to a single mixer. A pair of Doppler signals are sequentially derived from the mixer output. The phase relations of these Doppler signals determines the direction of radial target velocity and the range can be obtained from the setting of a variable delay line connected to the pulse generator.

INVENTOR,
Otto E. Rittenbach

DOPPLER RADAR WITH TARGET VELOCITY DIRECTION AND RANGE INDICATOR UTILIZING VARIABLE DELAY LINE

The invention described herein may be manufactured, used, and licensed by or for the Government for governmental purposes without the payment to me of any royalty thereon.

The present invention relates to Doppler radar and more particularly to such a radar capable of indicating the sense of radial target movement, either toward or away from the radar set, as well as the target range. My U.S. Pat. No. 3,442,430 discloses and claims several types of Doppler radars with target radial velocity direction capability. It is explained therein that the target direction is determined by the relative phases of two Doppler signals derived from a pair of echo-related signals which differ in RF phase by 90°. The radar of the present invention also determines the target direction by phase comparison, and in addition a range measurement feature is included which utilizes a variable delay line. The present radar utilizes only a single mixer, the differently phased Doppler signals appear in sequence at the mixer output. Sequentially opened gate circuits connected to the mixer output produce the two Doppler signals required for target directivity measurement. The continuous wave oscillator is periodically frequency modulated by the output of a pulse generator to periodically change the phase of the transmitted signal by 90°. The pulse generator output is also applied to a variable delay line and a fixed delay line in cascade and the outputs of the delay lines utilized to control separate early and late gates connected to the single mixer output. The setting of the variable delay line indicates target range and the relative phases of the Doppler signals in the two channels connected to the early and late gate outputs determine the direction of target motion along the radar beam.

It is thus an object of this invention to provide a Doppler radar set capable of measuring the sense of target directivity as well as range, utilizing novel and simple circuitry.

A further object is to provide a Doppler radar set with target range and sense of direction capability utilizing a single mixer and wherein the range is indicated by the setting of a variable delay line.

Figure 2:
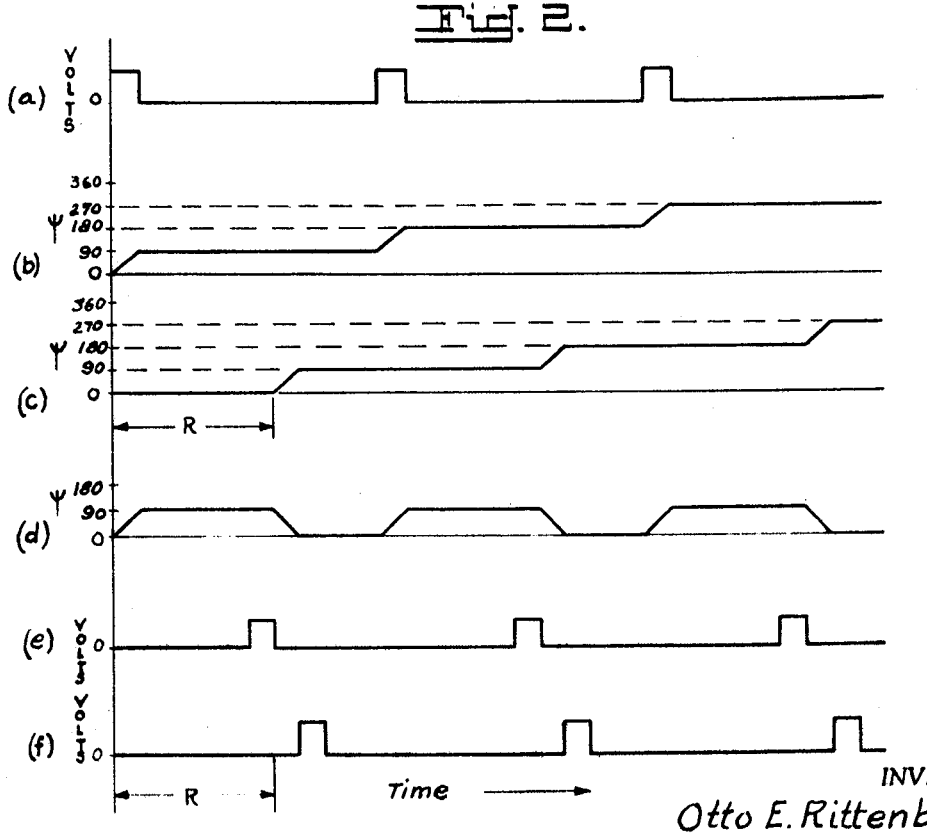

These and other objects and advantages of the invention will become apparent from the following detailed description and drawings, in which:

FIG. 1 is a block diagram of a preferred embodiment of the present invention; and FIG. 2 is a series of waveforms illustrating the operation of the radar of FIG. 1.

In the circuit of FIG. 1, the radar transmitter comprises a continuous wave oscillator 5, which may comprise a klystron which can be easily frequency modulated. The output of oscillator 5 is applied to antenna 11 via circulator 9 to form the transmitted beam or signal, $b$. The oscillator 5 is periodically modulated in frequency by means of the output of the pulse generator 37. The pulse duration and amplitude of generator 37 is selected so that the phase of the oscillator 5 changes by 90° with each pulse from 37. Target echo signals $c$ are received by antenna 11 and travel in the clockwise direction of easy energy flow around circulator 9 to the input of mixer 13. A small portion of the output of oscillator 5 travels in the reverse or counterclockwise direction around the circulator to the mixer input, as illustrated by the dashed-line arrow. A pair of gates 33 and 35, called early and late gates, respectively, are connected in parallel to the output of the mixer 13. A variable delay line 39 and a fixed delay line 41 are connected in cascade to the output of pulse generator 37. The output of variable delay line 39 is connected to and arranged to open the early gate 33 and similarly the output of delay line 41 opens late gate 35. The two gates 33 and 35 form the first elements of a pair of parallel Doppler signal channels. The first of these channels comprises gate 33, +45° phase shifter 17 and Doppler amplifier 19. The second channel comprises gate 35, −45° phase shifter 29 and Doppler amplifier 21. It should be noted that the two gates 33 and 35 may comprise identical circuitry, the adjectives early and late referring only to the sequence in which they are operated or opened. The two Doppler amplifiers may include filters or tuned circuitry for selecting only Doppler signals in a desired range of velocities and excluding others. The outputs of each of the Doppler amplifiers are applied to a multiplier 23 which in turn has its output connected to an integrator 25, which may comprise a simple low-pass filter. A zero-center meter 27 is connected to the integrator output. The functions of the multiplier 23, integrator 25 and meter 27 may be combined in a wattmeter, as shown for example in my above-cited patent, in either FIG. 3 or FIG. 4. The sense of deflection of the meter 27 indicates the sense of the target direction along the radar beam and the setting of the variable delay is directly proportional to target range and the adjustment knob thereof can be calibrated in range.

The mode of operation of the radar of FIG. 1 can be understood with respect to the waveforms of FIG. 2. FIG. 2a shows the output of pulse generator 37. The frequency of this generator is chosen such that the radar signal will have time between each successive pulse to travel round trip to a target at the maximum useable range of the system. The pulses of 2a are arranged to frequency modulate the oscillator 5. An abrupt frequency change will cause a gradual or linear phase change. The amount and duration of the frequency modulation or change is selected so that at the end or trailing edge of each pulse, the phase of the CW oscillator 5 has changed by 90°. This is illustrated by FIG. 2b which shows the phase of the transmitted signal, $b$. The echo signal returned by a particular target will have the same phase characteristics as the transmitted signal, but it will be shifted along the time axis by a time equal to the round trip transit time to that target. The phase characteristic of the echo signals picked up by antenna 11 is shown in FIG. 2c, R indicates the round trip time. The target echo signal $c$ and the leakage of the transmitted signal around the circulator 9 are both superimposed on each other at the mixer input. This superimposition results in a microwave signal with a phase characteristic as shown in FIG. 2d. This signal is seen to have a phase equal to the difference of the phases of the two component signals of which it is composed. It can be seen that at a time which is equal to the round trip transit time, which is proportional to the range, the mixer input signal undergoes a phase transition of 90°, and this phase transition can be utilized to measure range. FIGS. 2e and 2f respectively show the outputs of the two delay lines 39 and 41. It can be seen that the early gate 33 is opened just before the phase transition and the late gate just after the transition. In this way the Doppler signals of the two Doppler channels are derived from RF or microwave signals which differ by 90° in phase. When the two delayed pulses of 2e and 2f straddle the phase transition, as illustrated, the meter 27 will have a maximum deflection in the direction which indicates the direction of target movement. Thus a negative deflection may indicate an incoming target and positive deflection an outgoing one, or vice versa. In operation the variable delay line 39 would initially be adjusted to zero delay and the delay manually adjusted upward. When the two delayed pulses are straddling the phase transition, the meter deflection will be a maximum. The adjusting means of the delay line can be calibrated in range.

It should be noted that in this embodiment the Doppler signals are not derived directly from the echo signals but from the mixture or superposition of the echo signal plus circulator leakage. This mixed signal is called an echo-related signal herein.

The present circuit accomplishes the same result as does the circuit in my copending application, Ser. No. 4,656, filed Jan. 21, 1970, entitled "Doppler Radar with Target Velocity and Range Indication, Utilizing a Variable-Frequency Generator."

While the invention has been described in connection with specific illustrate embodiments, variations therein will occur to those skilled in the art without departing from the inventive concepts herein disclosed.

What is claimed is:

1. A Doppler radar set with target directivity and target range measurement capability, comprising, a continuous wave oscillator for generating the transmitted signal, means to periodically phase modulate said transmitted signal by means of a pulse generator, means to receive echo signals and superimpose a sample of the transmitted signal thereon to derive an echo-related signal which changes phase by 90° at the frequency of said pulse generator, a mixer, means to apply said echo-related signal to the input of said mixer, synchronously operated gate means at the output of said mixer for sequentially applying the output of said mixer to a pair of Doppler channels, circuit means at the output of said Doppler channels for indicating the target directivity by comparing the phases of signals in said pair of Doppler channels, and wherein said pulse generator produces a stream of pulses, each of which changes the phase of said continuous wave oscillator by 90° and wherein said gate means comprises a pair of early and late gate circuits connected to the output of said mixer, a variable delay line and a fixed delay line connected in cascade to the output of said pulse generator, the output of said two delay lines providing gate-opening signals to said early and late gates, separate ones of said Doppler channels being connected to the outputs of said early and late gates.

2. The radar set of claim 1 wherein the adjustment knob of said variable delay line is calibrated in range.